United States Patent
Pascazi (10) Patent No.: US 10,708,442 B2
(45) Date of Patent: Jul. 7, 2020

(54) SYSTEM AND METHOD FOR CELL PHONE TO CELL PHONE SIGNAL TRANSMISSION VIA THE INTERNET

(71) Applicant: Michael Pascazi, Hopewell Junction, NY (US)

(72) Inventor: Michael Pascazi, Hopewell Junction, NY (US)

( * ) Notice: Subject to any disclaimer, the term of this patent is extended or adjusted under 35 U.S.C. 154(b) by 0 days.

(21) Appl. No.: 14/992,543

(22) Filed: Jan. 11, 2016

(65) Prior Publication Data

US 2017/0244839 A1    Aug. 24, 2017

Related U.S. Application Data (63) Continuation of application No. 14/064,636, filed on Oct. 28, 2013, now abandoned, which is a continuation of application No. 09/902,466, filed on Jul. 10, 2001, now Pat. No. 8,588,770.

(60) Provisional application No. 60/217,554, filed on Jul. 12, 2000.

(51) Int. Cl.
    *H04M 7/12*   (2006.01)
    *H04M 7/00*   (2006.01)

(52) U.S. Cl.
    CPC ....... *H04M 7/1245* (2013.01); *H04M 7/0057* (2013.01); *H04M 2207/20* (2013.01)

(58) Field of Classification Search
    CPC .. H04M 7/1245; H04M 7/0057; H04W 40/00
    See application file for complete search history.

(56) References Cited

U.S. PATENT DOCUMENTS

| 3,560,669 | A | * | 2/1971 | Foulkes | H04B 3/20 379/406.07 |
|---|---|---|---|---|---|
| 5,553,137 | A | * | 9/1996 | Nyhart | H04M 9/082 379/402 |
| 5,768,308 | A | * | 6/1998 | Pon | H04M 3/40 370/287 |
| 5,859,907 | A | * | 1/1999 | Kawahara | H04B 3/238 379/406.08 |
| 6,064,873 | A | * | 5/2000 | Eriksson | H04M 9/082 455/403 |
| 6,085,072 | A | * | 7/2000 | Komiya | H04B 1/40 455/83 |
| 6,466,571 | B1 | | 10/2002 | Dynarski et al. | |
| 6,473,423 | B1 | * | 10/2002 | Tebeka | H04L 12/64 370/352 |
| 6,507,653 | B1 | * | 1/2003 | Romesburg | H04B 3/23 379/406.01 |

(Continued)

*Primary Examiner* — Andrew Lai
*Assistant Examiner* — Chuong M Nguyen
(74) *Attorney, Agent, or Firm* — Sofer & Haroun, LLP (57) ABSTRACT

A telephone system is provided for transmitting telephone signals between first and second mobile stations. The system includes a first internet protocol interface configured to receive an incoming cell phone signal generated by the first mobile station and to transmit the phone signal to the internet. A second internet protocol interface is configured to receive the phone signal sent through the internet by the first internet protocol interface and to transmit the phone signal to the second mobile station, such that users of the first and second mobile stations can engage in a conversation where the phone signals are communicated over substantial distances through the internet.

6 Claims, 6 Drawing Sheets

(56) References Cited

U.S. PATENT DOCUMENTS

| | | | |
|---|---|---|---|
| 6,549,937 B1 * | 4/2003 | Auerbach | H04L 29/06 709/206 |
| 6,574,213 B1 | 6/2003 | Anandakumar et al. | |
| 6,580,696 B1 | 6/2003 | Chen et al. | |
| 6,580,793 B1 | 6/2003 | Dunn et al. | |
| 6,636,506 B1 | 10/2003 | Fan | |
| 6,668,046 B1 | 12/2003 | Albal | |
| 6,690,681 B1 | 2/2004 | Preston et al. | |
| 6,693,894 B1 * | 2/2004 | Andersson | H04L 29/06 370/352 |
| 6,694,019 B1 | 2/2004 | Song | |
| 6,700,962 B1 | 3/2004 | Albal et al. | |
| 6,771,701 B1 * | 8/2004 | Klindworth | G10L 25/78 370/290 |
| 6,792,106 B1 | 9/2004 | Liu | |
| 6,804,244 B1 | 10/2004 | Anandakumar et al. | |
| 6,816,719 B1 | 11/2004 | Heinonen et al. | |
| 6,819,749 B1 | 11/2004 | Olafsson et al. | |
| 6,847,632 B1 | 1/2005 | Lee et al. | |
| 6,865,169 B1 | 3/2005 | Quayle et al. | |
| 7,304,962 B1 * | 12/2007 | Kirla | H04B 3/23 370/289 |
| 8,588,770 B2 * | 11/2013 | Pascazi | H04M 7/1235 455/428 |
| 2017/0244839 A1 * | 8/2017 | Pascazi | H04M 7/1245 |

\* cited by examiner

SYSTEM AND METHOD FOR CELL PHONE TO CELL PHONE SIGNAL TRANSMISSION VIA THE INTERNET

RELATED APPLICATION

This application is a continuation of U.S. patent application Ser. No. 14/064,636, filed on Oct. 28, 2013, which in turn is a continuation of U.S. patent application Ser. No. 09/902,466, filed on Jul. 10, 2001, which in turn claims the benefit of priority from U.S. Provisional Patent Application No. 60/217,554, filed on Jul. 12, 2000, the entirety of which are incorporated by reference.

BACKGROUND

Field of the Invention

The present invention relates to a system and method for transmitting cell phone signals between mobile stations via the internet or by a private packet switched network. More specifically, the invention relates to system and method by which cell phone signals are passed through the internet between a first and second interface or a private packet switched network rather than from cell tower to cell tower.

Description of Related Art

In the field of cell phone to cell phone communications, the current practice involves the transmission of cell phone signals via cell tower to cell tower etc. or via ground lines over long distances. These transmission methods have utilized an address signal originating from a first cell phone which is then received by a first cell tower. The first cell tower then directs the signal either tower to tower to a second receiving cell phone, or alternatively, to the public switched telephone network where the signal is routed to a second cell tower, and then to the destination cell phone.

Because cell phone signals travel over extended distances in either the public switched telephone network or from tower to tower, long distance costs for the service provider can be high. These current methods give rise for the elimination of the tower to tower transmission of cell phone signals as well as the minimization of long distance signals over the public switched telephone network. The present invention looks to overcome the disadvantages of the past methods, and provide a new method of cell phone to cell phone signal transmission via the internet or a private packet switched network.

OBJECTS AND SUMMARY

In accordance with one embodiment of the present invention, a system and method for transmitting cell phone signals includes a first and second mobile station, first and second cell towers, and first and second internet protocol interfaces.

In this system, a cell phone signal is generated at a first mobile station. This cell phone signal then travels through free air and is received by a first cell tower which transmits the signal down to the Public Switched Telephone Network where it is directed to a first transmitting internet protocol interface. From there, the cell phone signal is transmitted via the internet or a private packet switched network to a receiving internet protocol interface. The cell phone signal is then sent back through the Public Switched Telephone Network and out to a second cell tower. Finally, a second mobile station receives the cell phone signal from the second cell tower completing the cell phone call initiation. From there the process is repeated back and forth throughout the cell phone conversation until the call is completed.

In another embodiment of the present invention the transmission internet protocol interface and the receiving internet protocol interface are comprised of a signal unit at any single given location where a signal interface acts in both a transmission and receiving internet protocol interface, depending on which direction a cell phone signal is entering.

In another embodiment of the present invention both the transmission and receiving internet protocol interfaces are comprised of an address reader module, a software controller, an echo canceller/equalizer module, an analog/digital converter module and an internet protocol device module. In the transmission internet protocol interface, the internet protocol device is an internet protocol converter module and in the receiving internet protocol interface, the internet protocol device module is a internet protocol de-converter module.

In two alternative embodiments of the present invention, the internet protocol interfaces, when acting both roles as a transmission and a receiving internet protocol interface, can utilize a single set of internal components for the address reader module, the analog/digital converter module, the software controller module and the echo canceller/equalizer module or it can maintain a separate module for each role. If the interfaces maintain separate modules then each interface unit will have two address reader modules, analog/digital converter modules, software controller modules and echo canceller/equalizer modules, one set for the role as a transmission internet protocol interface and one for the role as a receiving internet protocol interface.

To this end a telephone system for transmitting telephone signals between first and second mobile stations is provided comprised of a first internet protocol interface configured to receive an incoming cell phone signal generated by the first mobile station, and to transmit that phone signal to the internet. A second internet protocol interface is provided and is configured to receive the phone signal sent through the internet by the first internet protocol interface and to transmit the phone signal to the second mobile station. Thus users of the first and second mobile stations can engage in a conversation where the phone signals are communicated over substantial distances through the internet.

DETAILED DESCRIPTION OF THE PREFERRED EMBODIMENTS

Figure 1:
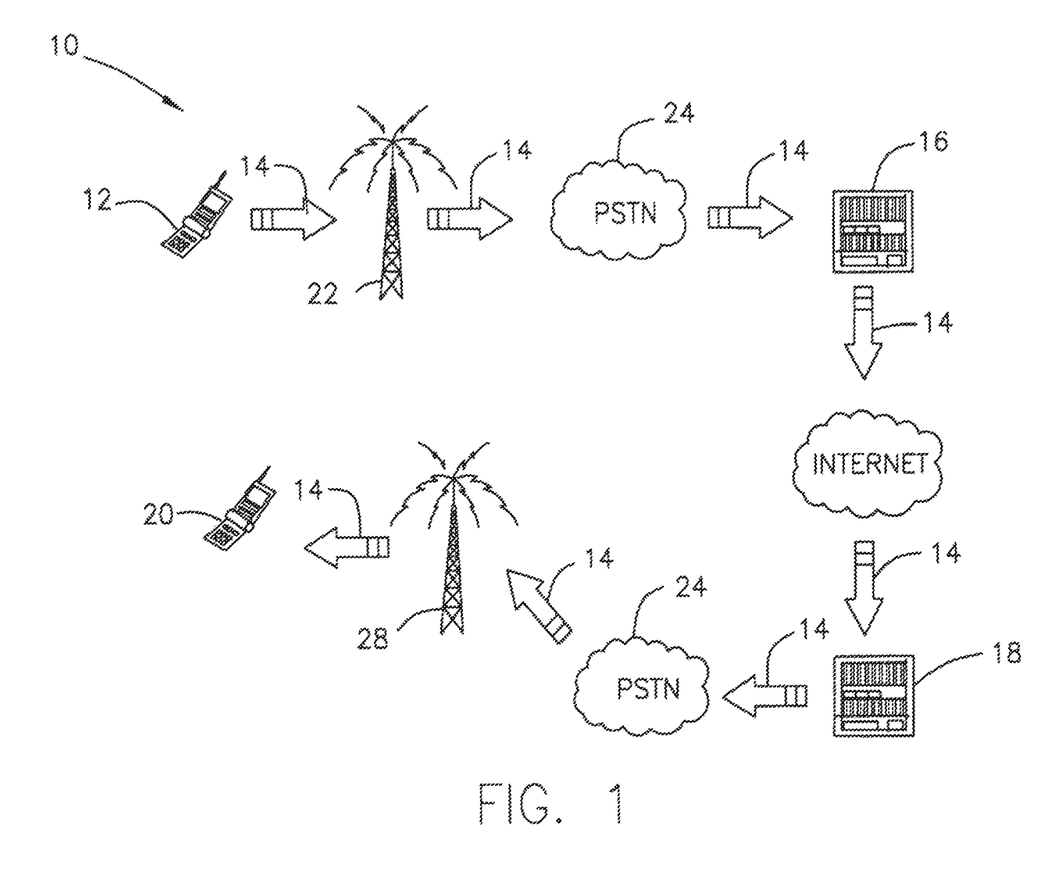
FIG. 1 illustrates a diagram showing the location of internet protocol interfaces for use in the transmission of a cell phone signal in accordance with one embodiment of the present invention.
Figure 2A:
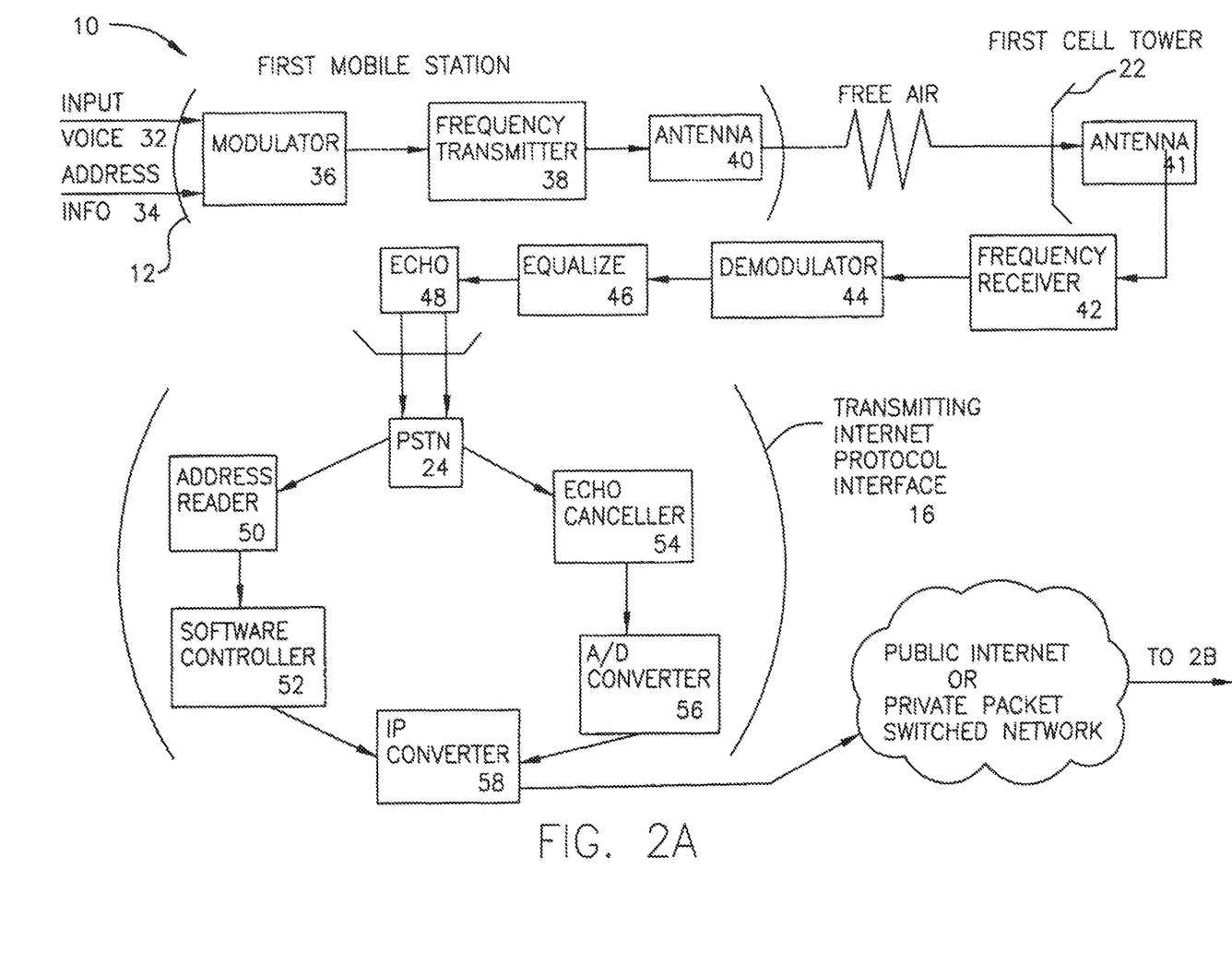
FIGS. 2A and 2B illustrate a diagram of internal components for use in the transmission of a cell phone signal through the system as set forth in FIG. 1, in accordance with one embodiment of the present invention.
Figure 2B:
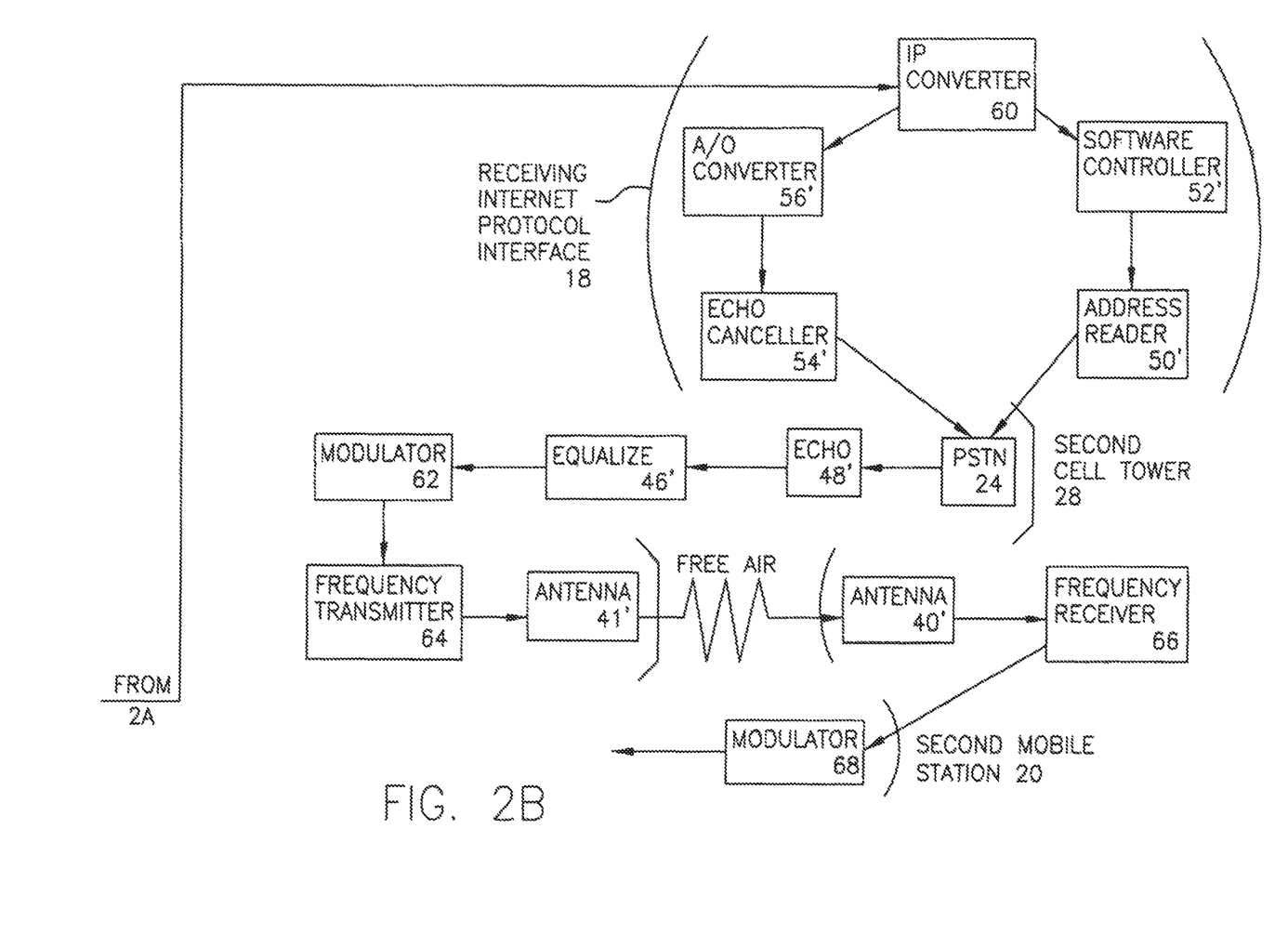

In one embodiment of the present invention, and as shown in FIGS. 1 and 2, a system 10 for transmitting cell phone signals for a cell phone to cell phone call is disclosed. System 10 utilizes a first mobile station 12 to generate a cell phone signal 14, a transmitting internet protocol interface 16, a receiving internet protocol interface 18 to transmit cell phone signal 14 and a second mobile station 20 which receives cell phone signal 14.

As illustrated in FIG. 1, a user is provided with a first mobile station 12, configured to send an outgoing cell phone signal 14. A first cell tower 22 that is designated by the local service provider for a given user location, is configured to transfers incoming calls from that location to the Public Switched Telephone Network (PSTN) 24 rather than from tower to tower. A transmitting internet protocol interface 16 is provided, configured to receive cell phone signal 14. Transmitting internet protocol interface 16 is further configured to embed cell phone signal 14 as packetized information in a digital data stream and transmit it through the internet or a private packet switched network to receiving internet protocol interface 18. Receiving internet protocol interface 18 is configured to receive cell phone signal 14 and convert it back into a standard phone signal 14 and to sends it out via PSTN 24 to a second cell tower 28. A second mobile station 20, provided to the call recipient in an area covered by system 10, is configured to receives cell phone signal 14 from second cell tower 28 completing the call connection.

A more detailed view of the components of system 10 is illustrated in FIGS. 2*a*, 2*b*, 3*a* and 3*b*. As pictured, an voice input 32, along with an addressing information 34 corresponding to the phone number dialed, are provided by first mobile station 12, as provided by the user. A modulating module 36 is provided which is configured to convert cell phone signal 14 to a radio frequency comprised of both voice input 32 and addressing information 34. Within first mobile station 12, a radio frequency transmitter 38 is provided for transmitting cell phone signal 14 into free air via an antenna 40, located on first mobile station 12.

A cell tower antenna 41 and a cell tower radio frequency receiver 42 located in first cell tower 22 are configured to receive incoming cell phone signal 14. A cell tower demodulator 44, is provided in first cell tower 22 and is configured to demodulate cell phone signal 14. A cell tower equalizing module 46 and a cell tower echo cancelling module 48 are configured to receive the demodulated signal from cell tower demodulator 44. These modules work to clarify cell phone signal 14 to correct distortion caused by travel of cell phone signal 14 through free air.

First cell tower 22 is further configured to transmit cell phone signal 14 into Public Switched Telephone Network 24 where addressing information 34 of cell phone signal 14 is used to direct the call to transmitting internet protocol interface 16.

Transmitting internet protocol interface 16, is configured to de-construct cell phone signal 14 into its component parts, voice input 32, corresponding to the voice of the user, and addressing information 34 corresponding to the final destination of the call.

Transmitting internet protocol interface 16 is provided with an address reader module 50 and a software controller module 52 configured to read and interpret addressing information 34. An interface echo canceller/equalizer module 54 is provided to further correct for any distortions caused by travel of voice input 32 through free air. An analog/digital converter module 56 is provided to convert cell phone signal 14 into digital format. Transmitting internet protocol interface 16 is further provided with an Internet Protocol (IP) converter module 58 configured to embed cell phone signal 14 into a digital data stream with an appropriate internet protocol using information from software controller module 52 to direct cell phone signal 14 through the internet or a private packet switched network to receiving internet protocol interface 18.

While crossing the internet or a private packet switched network, cell phone signal 14 can traverse many possible paths until ultimately addressing information 34 routes it to receiving internet protocol interface 18. A receiving internet protocol interface 18 is provided and configured to receive cell phone signal 14 and route it to an internet protocol de-converter module 60. Internet de-converter module 60 is configured to remove cell phone signal 14 from the digital data stream and convert it back to a standard digital phone signal where it is again split into its component parts; voice input 32 and addressing information 34. A software controller module 52' and an address reader module 50' are provided to process addressing information 34. A digital/analog converter module 56' and an interface echo canceller/equalizer module 54' are provided to convert cell phone signal 14 to analog and to provide echo cancellation/equalization so to correct for any distortions caused by the travel of cell phone signal 14 through the internet. Receiving internet protocol interface 18 is configured to combine voice input 32 and addressing information 34 components of cell phone signal 14 and to send it to the Public Switched Telephone Network 24 where it is delivered to a second cell tower 28 in system 10 which is in proximity to second mobile station 20.

Second cell tower 28 is configured to route cell phone signal 14 through cell tower echo canceller 48' and a cell tower equalizer 46'. Both cell tower echo canceller 48' and cell tower equalizer 46' are both configured to restructure cell phone signal 14 to cancel the effects of delay in propagation over long distances, and distortion in voice input 32 of cell phone signal 14 caused by travel through the internet. A cell tower modulator 62 is provided, configured to convert cell phone signal 14 into a radio frequency. Also provided are a cell tower radio frequency transmitter 64 and a cell tower antenna 41' through free air configured to propagate cell phone signal 14 through free air to second mobile station 20.

Second mobile station 20 is provided with an antenna 40' and a radio frequency receiver 66 configured to receive cell phone signal 14 from second cell tower 28. A demodulator module 68 is provided configured to demodulate cell phone signal 14. Thus, the end recipient of the call, using second mobile station 20, can receive the voice input 32 corresponding to the user's voice output placed by a user on first mobile station 12 via system 10. System 10 is further configured to communicate back to the caller using the same or similar components and pathways.

It should be noted that analog/digital converter 56 and digital/analog converter 56' are included because in certain cell phone technologies currently in use, Analog to digital conversion is necessary in order to packetize the information for transport through the internet. However, with the increasing availability of digital cell phones, incoming signals to internet protocol interfaces 16 and 18 may already be in digital format. Thus, components used to convert cell phone signal 14 from analog to digital and vise versa may be located at varying positions based on the providers capabilities. The present embodiment is only intended to show one particular embodiment of system 10 which is in no way intended to limit the scope of the present invention. System 10 is intended for use with both analog and digital cell phone systems.

In another embodiment of the present invention, although the system 10 is discussed utilizing two interface units, transmitting internet protocol interface 16 and receiving internet protocol interface 18, additional interface units can be used. A long distance service provider will most likely have a plurality of interfaces disposed about the regions that they intend to provide service for.

Additionally, the terms transmitting in transmitting internet protocol interface 16 and receiving in receiving internet protocol interface 18 are merely identifier terms related to there present function and communication pathway position described in the previous embodiment. However, any interface unit can both send and receive calls and can preform the functions of transmitting and receiving data, or even both at the same time in a multiple cell phone call situation. The terms transmitting and receiving are only used to clarify the specific function being described so as not to confuse the two operating interfaces and in no way are intended to limit the scope of the present invention.

Figure 3A:
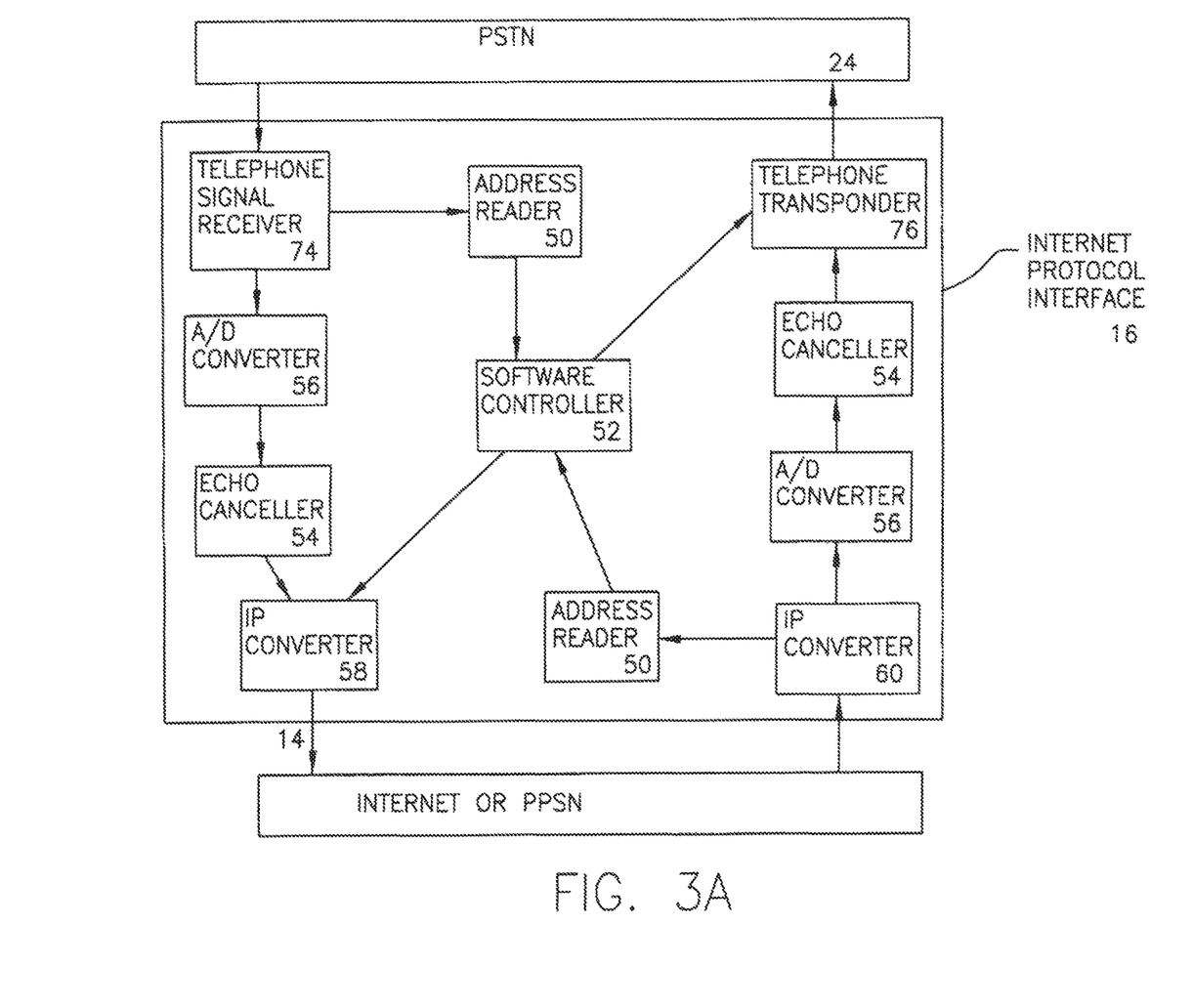
FIG. 3a illustrates an internal view of the components of an internet protocol interface in accordance with one embodiment of the present invention.

For example, in one embodiment of the preferred embodiment, as illustrated in FIG. 3a an internet protocol interface is comprised of all of the components necessary to function as both first internet protocol interface 16 and second internet protocol interface 18. Thus, this interface is comprised of a software controller module 52 (also acting as software controller 52'), address reader modules 50 and 50', an internal bus system 72, a telephone signal receiver module 74, a telephone signal transponder module 76, digital analog converters 56 and 56', echo canceller/equalizer modules 54 and 54', an internet protocol converter 58 and an internet protocol de-converter 60. In this sample of an internet protocol interface internal configuration, these modules are used to complete the role as both transmitting internet protocol interface 16 and receiving internet protocol interface 18.

In one embodiment of the present invention, as illustrated in FIG. 3a an internet protocol interface in the functional role of transmitting internet protocol interface 16, cell phone signal 14 enters via telephone signal receiver module 74, is split into its component parts; voice input 32 and addressing information 34. From there, the split signal is routed through transmission internet protocol interface 16 via internal bus system 72 through components; digital/analog converter 56, echo canceller/equalizer module 54 address reader module 50 software controller module 52, and an internet protocol converter 58.

When functioning in the role of receiving internet protocol interface 18, cell phone signal enters from the internet or private packet switched network into internet protocol de-converter 60. From there, cell phone signal 14 is split into its component parts; voice input 32 and addressing information 34. The split signal is then routed through receiver internet protocol interface 18 via internal serial bus system 72 through components; digital/analog converter 56', echo canceller/equalizer module 54', address reader module 50', software controller module 52 and telephone signal transponder module 76.

The routing of cell phone signal 14 is more fully described in the method of transmission to be discussed next. The above representations of one embodiment of the present invention is to illustrate one embodiment of the components used to operate system 10. However, it should be appreciated that this is merely one possible example of the configuration for internet protocol interfaces and is no way intended to limit the scope of the invention.

Figure 3B:
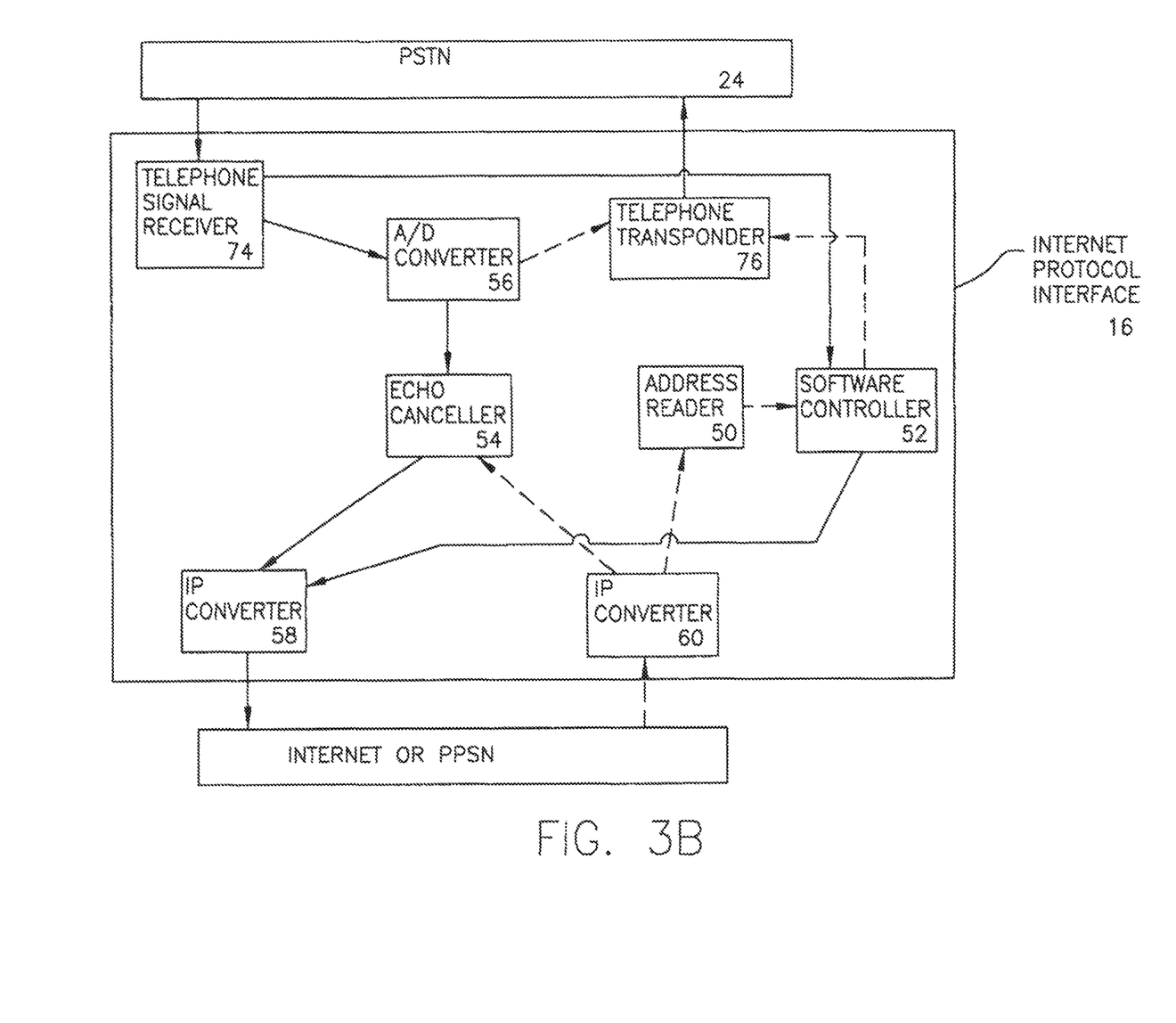
FIG. 3b illustrates an alternative configuration of the components of an internet protocol interface in accordance with one embodiment of the present invention.

For example, FIG. 3b illustrates a transmitting internet protocol interface 16 and receiving internet protocol interface 18 where the internal components are combined when redundant. Address reader modules 50 and 50', software controller modules 52 and 52', equalizer/echo canceller modules 54 and 54' and digital/analog converters 56 and 56' are combined such that the functions of multiple modules are integrated into single hardware units capable of operating in both transmitting and receiving communication pathways. Thus, as illustrated in FIG. 3b, an alternative configuration for the internal modules of internet protocol interfaces 16 and 18 which uses single units for both the transmission and receiver function modes, is within the contemplation of the present invention.

In another embodiment of the present invention, system 10 is used in conjunction with the current cell phone technology Code Divisional Multiple Access (CDMA). However, system 10 can be modified to be used with other technologies available, such as Time Divisional Multiple Access (TDMA) or Global System for Mobile communication (GSM), should the need or desire arise. The modules and devices disclosed above are intended to illustrate one embodiment of the present invention and is no way intended to limit the scope of this invention. Alternate modules used to enhance signal clarity and additional features can be added or removed from the invention. Any system that uses at least two internet protocol interfaces to transmit cellular phone signals via the internet or a private packet switched network is contemplated by this invention.

It should be noted that, in general, the distortion in cell to cell telephony is usually caused by the bouncing of the signal off of obstructions and by the boosting of the signal to cover long distances. These distortions usually take the form of lag time delay and echoing. These distortions are removed in regular cell calls by echo cancellers 48 and 48' and equalizers 46 and 46' located in first cell tower 22 and second cell tower 28.

However, in the aforementioned system 10, cell phone signal 14 does not only experience these problems as a result of obstructions or propagation boosting to cover distances of free air, but also, in system 10, cell phone signal 14 travels most of its distance through the internet or a private packet switched network, experiencing server delays and other signal distortions as a result of standard problems associated with the internet. Cell tower echo cancellers 48 and 48' and cell tower equalizers 46 and 46' are able to cancel these effects the same as if the distortions were caused by open air obstructions. This stabilizes cell phone signal 14 and eliminates most of the lag delay in analog input 32 portion. Additionally, each of the two internet protocol interfaces 16 and 18 has internal echo cancelling and equalizing features, as represented by interface echo canceller/equalizer modules 54 and 54'.

Figure 4:
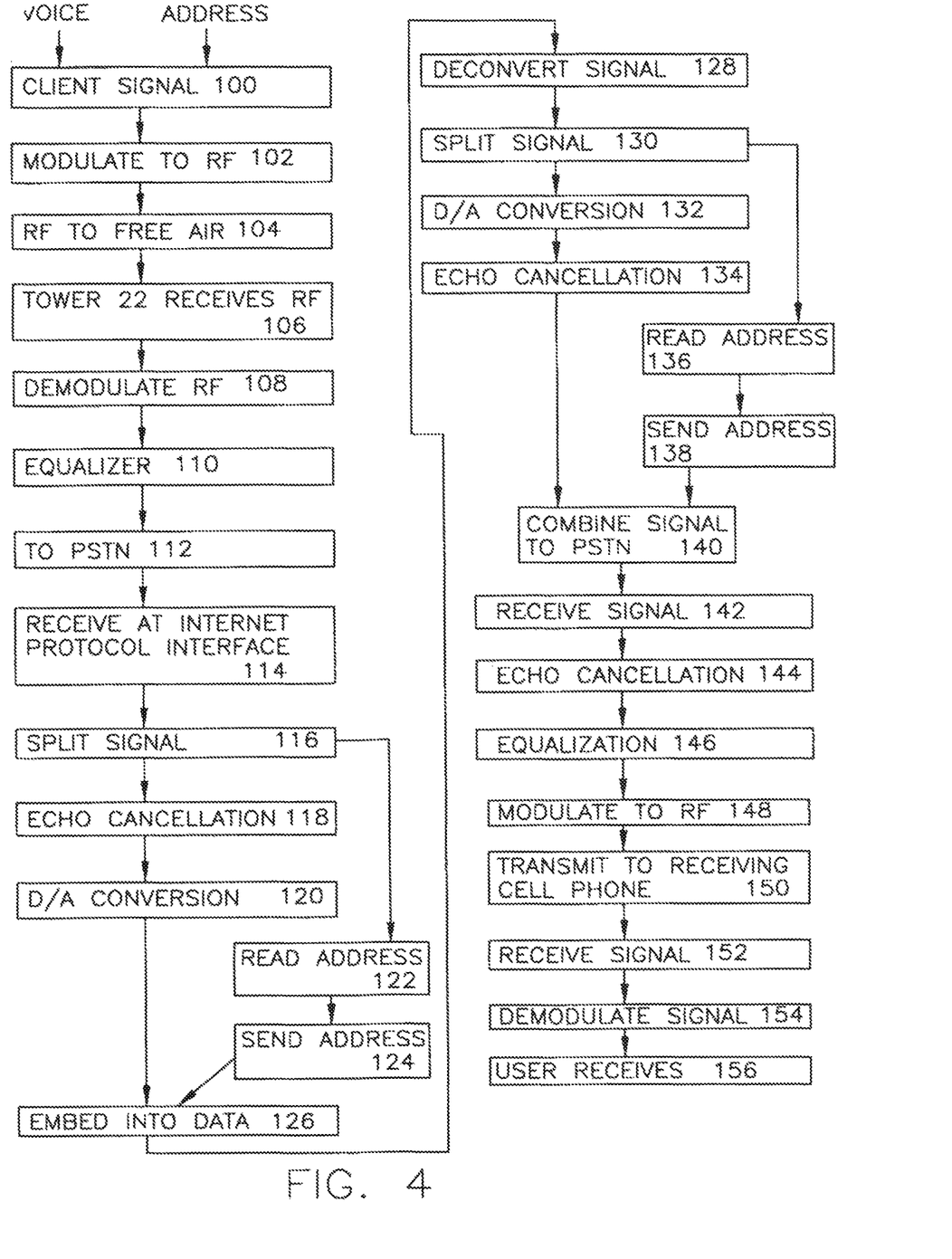
FIG. 4 is a block diagram illustrating the method of transmission of a cell phone signal in accordance with one embodiment of the present invention.

In another embodiment of the invention, as illustrated in block diagram flow chart FIG. 4, a method is disclosed for mobile station to mobile station communications across system 10 via the internet or private packet switched network. In a first step 100, a cell phone signal 14 is created when a user creates voice input 32 (the voice of the user) and addressing information 34, the number dialed. In step 102, cell phone signal 14 is modulated into a radio frequency by modulator module 31 of first mobile station 12. Next, in step 104, radio frequency transmitter 36 transmits cell phone signal 14 into free air via antenna 40.

At step 106, cell tower radio frequency receiver 42 of first cell tower 22 collects cell phone signal 14. In step 108, the signal is routed through cell tower demodulator 44 and converted to a standard telephone signal format. Next, at step 110, cell phone signal 14 is equalized in cell tower equalizer 46, and echo cancelled in cell tower echo canceller 48. Cell phone signal 14 is then routed to Public Switched Telephone Network (PSTN) 24 at step 112.

After cell phone signal 14 traverses PSTN 24, it is received by transmission internet protocol interface 16 at step 114. Next, at step 116, cell phone signal 14 is split into its component parts; voice input 32 and addressing information 34. At step 118, voice input 32 portion of cell phone signal 14 is echo cancelled and equalized by echo canceller/equalizer 54. Additionally, at step 120, voice input portion 32 of cell phone signal 14 is converted to digital in analog/digital converter 56, if necessary. Simultaneously, at step 122, address information 34 portion of cell phone signal 14 is routed through address reader module 50, and subsequently, at step 124, addressing information 34 is sent to software controller module 52. Next, at step 126, addressing information 34 and voice input 32 portions of cell phone signal 14 are recombined and embedded as packetized information into a digital datastream in internet protocol converter 58 then sent out over the internet or private packet switched network.

At step 128, after traversing the internet or a private packet switched network, cell phone signal 14 is received at internet protocol de-converter 60 located in receiving internet protocol interface 18. Next, at step 130, cell phone signal 14 is split into its component parts; voice input 32 and addressing information 34. A step 132, voice input 32 is routed through digital/analog converter 56' and additionally, at step 134, it is echo cancelled and equalized in echo canceller/equalizer module 54'. Simultaneously, at step 136, addressing information 34 is routed through address reader 50' and subsequently, at step 138, it is read by software controller 52'. Next, at step 140, voice input 32 and addressing information 34 components of cell phone signal 14 are recombined and sent through PSTN 24 for delivery to the appropriate cell tower.

At step 142, cell phone signal is received by second cell tower 28. Next, at step 144 cell phone signal is echo cancelled in cell tower echo canceller 48' and subsequently, at step 146, it is equalized by cell tower equalizer 46'. At step 148, cell phone signal 14 is converted to a radio frequency by cell tower modulator 62, and then, at step 150 it is transmitted to free air via cell tower radio frequency transmitter 64 through cell tower antenna 41'.

At step 152, cell phone signal 14 is received at antenna 40' of second mobile station 20. Next, at step 154, cell phone signal 14 is routed through radio frequency receiver 66 and subsequently routed through demodulator 68 where cell phone signal 14 is taken out of radio frequency and transformed into an audible signal. Finally at step 156, the end listener hears audible signal and can respond using the same or similar methodology. The present invention allows a user of the first mobile station 12 to place a short distanced call to transmitting internet protocol interface 16 via first cell tower 22. Here, cell phone signal 14 travels a short distance before reaching the transmitting internet protocol interface 16. From there, cell phone signal 14 travels through the internet or a private packet switched network until it reaches the destination receiving internet protocol interface 18. This signal transfer through the internet, free and available to the public, incurs no long distance fees for a long distance service provider regardless of the geographic distance traversed by a call.

Methods disclosed in the prior art include the use of cell tower bouncing and use of land lines to propagate the signals across long distances. Either of these methods are costly for the service provider and ultimately for the users, as use of land lines and satellites increase relatively proportionally as the distance between callers increases. As such, the price of these calls increase. In the present invention, the use of the internet to traverse most of the distance between the mobile stations eliminates this disadvantage associated with the prior art. This a particular advantage to cell to cell phone telephony between callers located in different countries, particularly where the cell tower infrastructure is costly and underdeveloped. Local providers for cell phone service provide the local cell networks and cell towers which a long distance service provider works through when utilizing this invention. Because cell phone signal 14 travels most of its distance cost free, through internet or private packet switched network communication lines, this invention can improve the low cost availability of cell phone to cell phone communications worldwide.

For example, in one embodiment of the present invention a cell phone signal 14 initiated at a first mobile station 12 in Greece would initially travel to a first cell tower located nearby. The signal would immediately be directed down to PSTN 24 and over to a locally positioned transmitting internet protocol interface 16. From here cell phone signal 14 is embedded in a packetized data stream and is sent through the internet to a receiving internet protocol interface 16 located proximally to the second mobile station 20, to which it is ultimately delivered. Thus long distance and international charges are avoided by the service provider using system 10.

A further advantage to using this system is that the long distance service provider uses the internet to transmit cell phone signal 14. The relatively small, inexpensive interface units used to rout cell phone signal 14 will operate at a very low overhead cost.

What is claimed is:

1. A telephone system for transmitting telephone signals between first and second mobile stations, said system comprising:
    a first internet protocol interface with echo cancellation for adjusting for time lag or time delays due to cell phone signal distortions caused by multiple different internet pathways for said telephone signals, said first internet protocol interface configured to receive incoming cell phone signals generated by the first mobile station from a first cell tower having a first cell tower echo canceller for the adjusting for time lag or the time delays caused by physical obstructions, and to transmit said cell phone signals to the internet for delivery to the second mobile station,
    wherein said first and second mobile stations have internal echo cancellation modules, such that users of the first and second mobile stations can engage in a conversation where said cell phone signals are communicated over substantial distances through the internet through at least first echo cancelled internet protocol interface, wherein said first echo cancelled internet protocol interface and said first and second mobile stations, are configured to correct distortions in said cell phone signals not corrected by said first cell tower echo canceller, caused by the travel of said cell phone signals by internet delays.

2. The telephone system as claimed in claim 1, wherein said first echo cancelled internet protocol interface is further comprised of a first address reader module configured to read a phone number of the second mobile station entered by a user of the first mobile station.

3. The telephone system as claimed in claim 2, wherein said first echo cancelled internet protocol interface is further comprised of a first software controller module configured to process address information for the second mobile station provided by said first address reader module.

4. The telephone system as claimed in claim 1, wherein said first echo cancelled internet protocol interface is further comprised of a first analog-to-digital converter configured to convert a voice portion of said cell phone signals into digital format.

5. The telephone system as claimed in claim 1, wherein said first echo cancelled internet protocol interface is further comprised of an internet protocol converter module configured to embed said cell phone signals into a packetized digital data stream for transmission through the internet.

6. The telephone system as claimed in claim 1, wherein the first and second mobile stations are cell phones.

\* \* \* \* \*